United States Patent [19]
Garcia et al.

[11] Patent Number: 6,054,847
[45] Date of Patent: Apr. 25, 2000

[54] METHOD AND APPARATUS TO AUTOMATICALLY SELECT OPERATING VOLTAGES FOR A DEVICE

[75] Inventors: Ray Garcia; Kendall Anthony Honeycutt, both of Boca Raton; Stephen Eugene Still, Lake Worth, all of Fla.

[73] Assignee: International Business Machines Corp., Armonk, N.Y.

[21] Appl. No.: 09/150,393

[22] Filed: Sep. 9, 1998

[51] Int. Cl.[7] .................................................. G05F 3/08
[52] U.S. Cl. ............................................................ 323/354
[58] Field of Search ................................... 323/352, 353, 323/354

[56] References Cited

U.S. PATENT DOCUMENTS

| | | | |
|---|---|---|---|
| 4,258,310 | 3/1981 | Asakawa et al. | 323/281 |
| 4,489,270 | 12/1984 | Diller | 323/354 |
| 4,849,903 | 7/1989 | Fletcher et al. | 364/482 |
| 4,947,102 | 8/1990 | Ekstrand et al. | 323/293 |
| 5,191,279 | 3/1993 | Zommer | 323/354 |
| 5,208,842 | 5/1993 | Atwood et al. | 377/55 |
| 5,336,986 | 8/1994 | Allman | 323/268 |
| 5,532,580 | 7/1996 | Shu et al. | 323/354 |
| 5,828,209 | 10/1998 | Janssen | 323/354 |
| 5,831,419 | 11/1998 | Casper | 323/274 |

*Primary Examiner*—Adolf Deneke Berhane
*Attorney, Agent, or Firm*—Gunster, Yoakley, Valdes-Fauli & Stewart, P.A.; Jon A. Gibbons

[57] ABSTRACT

A method and apparatus to automatically select operating voltages for a device. The method comprising the steps of: connecting a variable resistive network in series to a first side of a resistor for varying the current through the resistor; charging an inductor with a modulate pulse train, the inductor being connected to the second side of the resistor; outputting a voltage equal to the voltage across the resistor and a fixed reference voltage located at the first side of the resistor; determining if at least one designated processor pin is connected to ground; and varying the resistance of the resistive network if at least one pin is connected to ground so as to change the current flowing through the resistor, thereby changing the voltage across it.

12 Claims, 2 Drawing Sheets

METHOD AND APPARATUS TO AUTOMATICALLY SELECT OPERATING VOLTAGES FOR A DEVICE

CROSS-REFERENCE TO RELATED APPLICATIONS

Not applicable

BACKGROUND OF THE INVENTION

1. Field of the Invention

This invention relates generally to the field of computers and more particularly to supplying multiple voltage configurations for supporting different families of commercially available semiconductor devices.

2. Description of the Related Art

The Intel compatible processor family has been extended with the introduction of MMX (MultiMedia extensions) technology. The Intel Pentium processor with MMX technology extends the Intel Pentium family of microprocessors. It is both binary compatible and pin compatible with a large family of Intel processors including: Intel 8086/88, 80286, Intel 386 DX, Intel 386 SX, Intel 486 DX, Intel 486 SX and Intel 486 DX2 processors. When designing computers, and more specifically printed circuit boards to accommodate the Pentium with MMX technology compatible processors, there are a number of electrical differences from the "Classic" or Intel Pentium processors and the Pentium with MMX technology that a systems designer must address. The main electrical difference is the operating voltage. Usually, the faster Classic Pentium processors, i.e., the processors with speeds equal to and greater to 75 MHz of clock speeds, require only one operating voltage for both the processor core and the processor I/O pins. This voltage is designated as $V_{CC}$. For Classic Pentium processors with speeds of 75 MHZ, 100 MHZ, 120 MHZ, 133 MHZ and 150 MHZ, $V_{CC}$ is equal to 3.3 VDC. For Classic Pentium processors with clock speeds of 166 MHZ and 200 MHZ. $V_{CC}$ is 3.5 VDC. This information can be found in the Intel Pentium Processor Data Sheets, available online URL at www.intel.com and available for download at ftp://download.intel.com/design/pentium/datashts/ in an Adobe Acrobat format. System designers wishing to accommodate the entire family of these available faster Classic Pentium processors can connect all the voltage supply pins together on a single power plane and adjust the voltage to the power plane according to the Classic processor speed. The 3.3 VDC Classic Pentium processors can operate at 3.5 VDC. Therefore, a system designer can specify a power supply with 3.5 VDC output and run the entire Classic Pentium family of processors. However, most AT PC power supplies provide +5 VDC, Ground, +12 VDC and −12 VDC, to provide 3.5 VDC, special power supplies are needed. An alternate method system designer can use to avoid the cost of special power supples with 3.5 VDC output is the use of a DC to DC converter. A DC to DC converter, mounted locally on the system board to convert the 5 VDC to the 3.3 VDC required for the Classic Pentium Processor.

Unlike any of its Classic Intel Pentium predecessors, the Intel Pentium processor with MMX technology requires two separate voltage inputs. One voltage input of 3.3 VDC for the processor I/O pins, called $V_{CC2}$, and second voltage of 2.8 VDC for the processor core called $V_{CC3}$. System designers wanting to accommodate all the faster Pentium Classic processors and also the Pentium processors with MMX technology processors in a single printed circuit board design, must supply the two voltage requirements. One method in which a system designer provides the two voltage requirements is through a local DC to DC converter. Using a 5 VDC to 2.8 VDC DC to DC converter and a combination of jumpers, system board designers can accommodate the family of pin compatible faster Classic Pentium and Pentium with MMX technology compatible processors. However, this approach is not without its shortcomings. One shortcoming is the need to manually select jumpers to supply the correct core operating voltage for a selected processor. Correctly selecting jumpers can be difficult, especially for system board designs that support a variety of processors. Accordingly, a need exists to overcome this short coming.

The use of other pin compatible Pentium processors such as the AMD K6 100 MHZ to 300 MHZ family of processors with MMX technology require a core operating voltage that is different from the Intel processors with MMX technology. The core operating voltage, $V_{CC3}$ is 2.2 VDC. Many system designers want to accommodate the AMD K6 100 MHZ to 300 MHZ family of processors with MMX technology plus the faster Intel Classic Processors and the Intel Processors with MMX technology must now provide a third level of operating voltage on top of the two previously mentioned. The system designer is faced with having to provide additional local DC to DC convertors on the system board with additional replacement jumpers. Providing multiple pluggable DC to DC converters to accommodate many different processor types can be expensive. Many users are apt to select one processor type when initially installing a system and lose or misplace the additional hardware to accommodate other processor types. The requirement of additional hardware in many ways defeats the purpose of having a configurable system board once the board is installed if the additional on board hardware is misplaced or lost. Accordingly, a need exists for a configurable system board without the need for supplying a variety of pluggable on board DC to DC convertors to provide the desired processor core operating voltage.

Another shortcoming with using multiple pluggable regulators on the system board with some additional replacement jumpers is the complexity of plugging in jumpers to support the various operating core voltages for microprocessors. Therefore, a need exists to provide a method and apparatus to automatically select the core processor voltage based on the type of processor installed.

SUMMARY OF THE INVENTION

Briefly, in accordance with the present invention, a method to automatically select operating voltages for a device comprising the steps of: connecting a variable resistive network in series to a first side of a resistor for varying the current through the resistor; charging an inductor with a modulate pulse train, the inductor being connected to the second side of the resistor; outputting a voltage equal to the voltage across the resistor and a fixed reference voltage located at the first side of the resistor; determining if at least one designated processor pin is connected to ground; and varying the resistance of the resistive network if at least one pin is connected to ground so as to change the current flowing through the resistor, thereby changing the voltage across it. In accordance with another aspect of the invention, an apparatus is described to carry out the above process.

DETAILED DESCRIPTION OF AN EMBODIMENT

Figure 1:
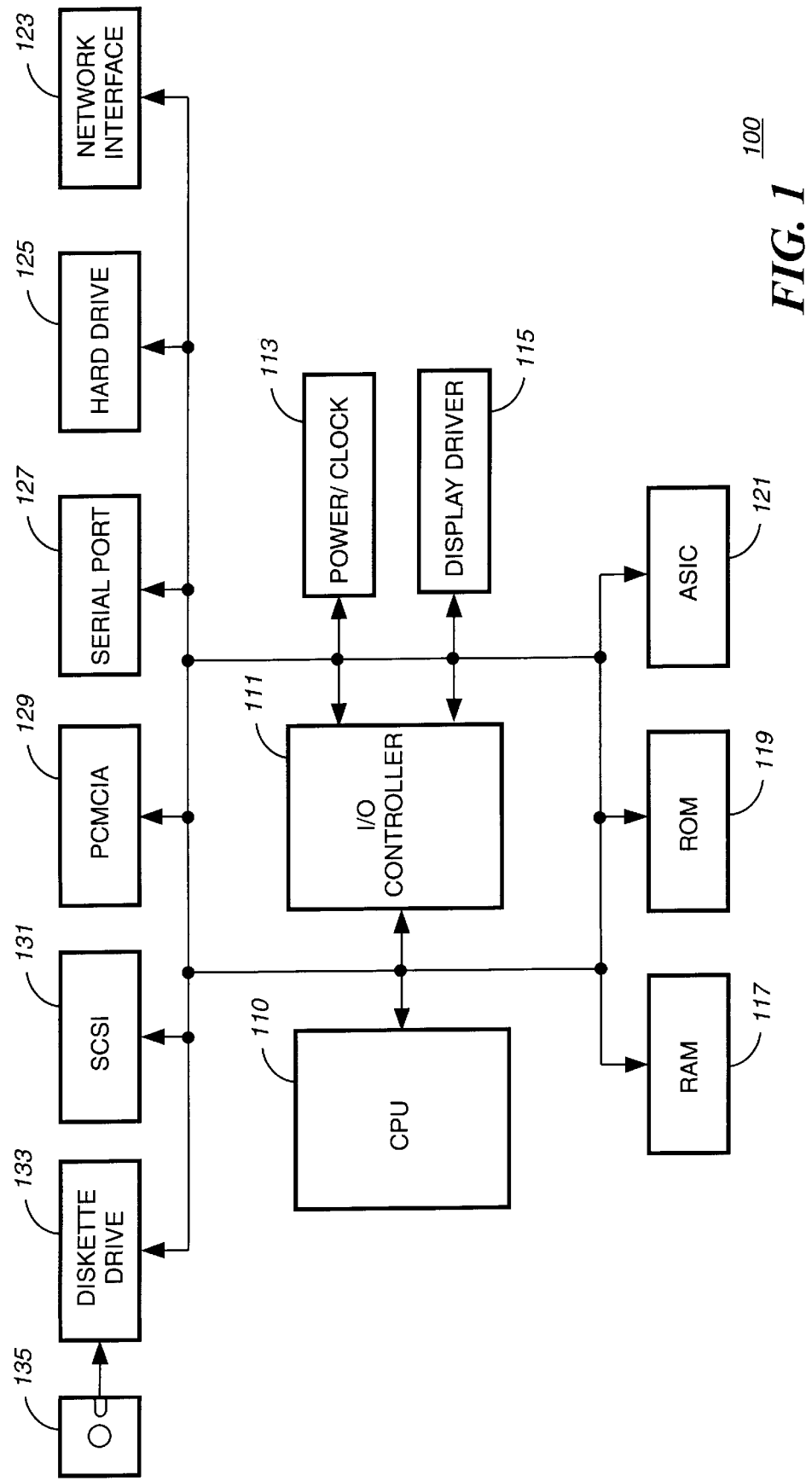
FIG. 1 is a block diagram is a block diagram of the major electrical components of an information processing according to the present invention.

Referring to FIG. 1, there is shown a block diagram of the major electrical components of an information processing device 100 in accordance with this invention. The electrical components include: a central processing unit (CPU) 110, an Input/Output (I/O) Controller 111, a system power and clock source 113; display driver 115; RAM 117; ROM 119; ASIC (application specific integrated circuit) 121 and a hard disk drive 125. These are representative components of a computer. The operation of a computer comprising these elements is well understood. Network interface 123 provides connection to a computer network such as Ethernet, TCP/IP or other popular protocol network interfaces. Optional components for interfacing to external peripherals include: a Small Computer Systems Interface (SCSI) port 131 for attaching peripherals; a PCMCIA slot 129; and serial port 127. An optional diskette drive 133 is shown for loading or saving code to removable diskettes 135. The system 100 may be implemented by combination of hardware and software. It should be understood that system 100 can be implemented as a single board computer (SBC), where several peripheral components such as diskette drive 133, hard drive 125 and network interface 123 can be place on separate cards or boards as needed. A system board, sometimes called a motherboard is the physical arrangement in a computer that contains the computer's basic circuitry and components. On the typical motherboard, the circuitry is imprinted or affixed to the surface of a firm planar surface and usually manufactured in a single step. The most common motherboard design in desktop computers today is the AT, based on the IBM AT motherboard. A more recent motherboard specification, ATX, improves on the AT design. In both the AT and ATX designs, the computer components included in the motherboard are: CPU, ROM, RAM, BIOS, expansion slots and Interconnecting circuitry. Additional components can be added to a motherboard through its expansion slots. The electronic interface between the motherboard and the smaller boards or cards in the expansion slots is called the bus.

The CPU 110 can be any Intel Pentium processor or compatible processors. The term compatible is used to mean that the electrical pin definition for the CPU 110 is identical. Compatible may also be used to describe that the CPU is binary compatible meaning that programs written for one CPU will run on another CPU without the need to change to program or to recompile. The term device means any semiconductor device and includes microprocessors, microcontrollers or any other pin compatible electronic part.

Figure 2:
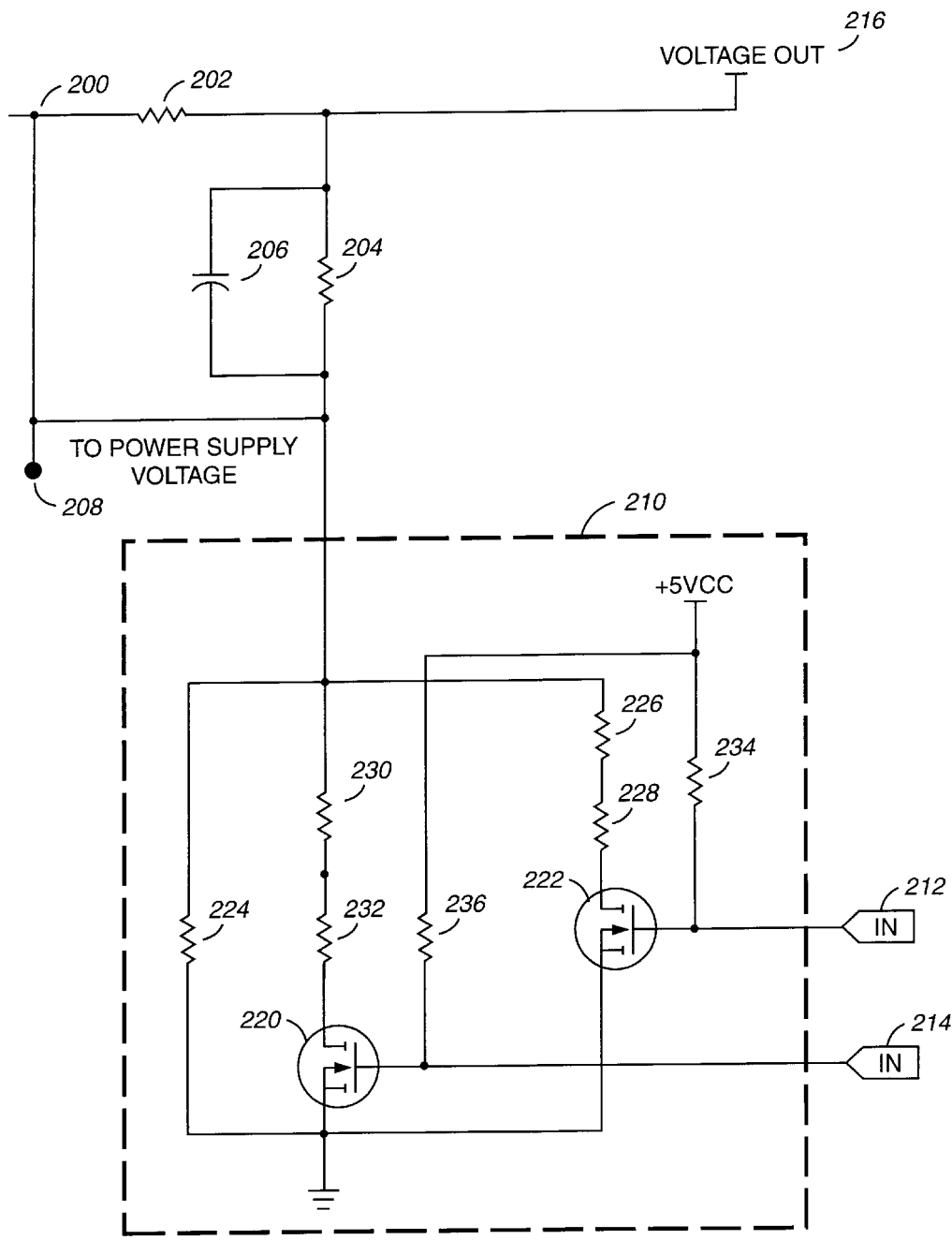
FIG. 2 is an electrical schematic of the automatic sense circuit for selecting the core operating voltage of the processor according to the invention.

Referring now to FIG. 2, there is shown an electrical schematic of the automatic sense circuit for selecting the core operating voltage of the CPU. A switching PC (Personal Computer) power supply (not shown) produces a pulse width modulated 0–5 VDC train to point 200. This charges inductor 202. The voltage potential of the pulse width modulated train to point 200 can be adjusted to any voltage range that is equal to or greater than the maximum voltage required at point 216. Inductor 202 is a 1.8 micro-Henry inductor. A 17.8 kOhms resistor 204 in parallel with 680 pf capacitor 206, has the voltage from the inductor impressed across it. The voltage across resistor 204 is directly proportional to the current running through it. A voltage sense 208 is supplied to the power supply 113 to provide closed loop feedback. The voltage sense 208 is kept to a voltage of 1.25 VDC by varying the charging of inductor 202 by the pulse width modulation of power supply (not shown) connected to point 200. The purpose of capacitor 206 is to function as a lead capacitor to help the power supply (not shown) anticipate any changes in voltage output 216 at point 208 that may be occurring as the result of the sudden load fluctuation of the device attached to voltage output 216 before the change is reflected across resistor 204.

A variable resistive network 210 is connected in series to resistor 204 and capacitor 206. The variable resistive network 210 allows a variety of resistors to be switched-in as controlled by the binary combination of the select lines 212 and 214 chosen. In this embodiment, the select lines 212 and 214 are either opened (i.e., floating) or grounded. With two select lines there are $2^2$ or four combinations of resistive combinations that may be possible. The various combination of resistors modifies the current that flows through resistor 204. The voltage to the processor core 216 is equal to the sum of the voltage across resistor 204 plus the voltage at point 208. Recall the voltage at point 208 is kept constant. In this embodiment, the voltage at point 208 is 1.25 VDC, so the resulting voltage to the processor core is simply the voltage across resistor 204 plus 1.25 VDC. The varying of the current through resistor 204 using resistive network 210 provides a variable voltage to processor core 216.

A detail description of the variable resistive network 210 will now be discussed. The variable resistive network 210 has the following component values in the preferred embodiment. Transistor biasing resistors 234 and 236 have a value of 10 kOhms. If both the select lines 212 and 214 are grounded, the two mosfet 2N7002 transistors 220 and 222 are both shut off. The resistance of the network is equal to the resistance of 23.2 kOhms for resistor 224. The resulting current through resistor 204 is approximately 53 microamps. The voltage produced across resistor 204 is 0.95 VDC. The voltage to the processor core at point 216 is then equal to 2.2 VDC, which is the combination of the fixed voltage 1.25 VDC plus the 0.95 VDC across resistor 204. This is the core operating voltage required for the family of AMD K6 compatible processors with MMX technology.

The core operating voltage of 2.8 VDC will now be discussed. When the select line 212 is floating, (i.e., not grounded), and select line 214 is grounded, transistor 220 is turned off and transistor 222 is turned on. This results in the combination of resistor 224 in parallel with the series combination of resistor 226 and resistor 228 to be switched-in. Resistor 226 is 37.4 kOhms and resistor 228 is 324 Ohms. The resulting resistance draws an 87 microamps flow through resistor 204. The voltage to a processor core at point 216 is equal to 2.8 VDC. This is the combination of the fixed voltage of 1.25 VDC at point 208 plus the voltage drop of 1.55 VDC across resistor 204. The 2.8 VDC core operating voltage is required for the Intel compatible family of Pentium processors with MMX technology.

The case of core operating voltage of 3.5 VDC will now be discussed. When each of the select lines 212 and 214 floating, both transistors 222 and 220 are turned on. The resistance of 31.992 Ohms (a 31.6 kOhms for resistor 230 in series with 392 Ohms for resistor 232) is switched-in. This results in 31.992 Ohms connected in parallel with resistor 224 and connected in parallel with the series combination of resistor 226 and resistor 228. This draws a 126 microamps current through resistor 204. A core operating voltage of 3.5 VDC at point 216 is produced. The 3.5 VDC voltage is equal to the set voltage 1.25 VDC at point 208 plus the 2.25 VDC drop across resistor 204. The 3.5 VDC is the core operating voltage for Classic Pentium processors.

In the preferred embodiment, only three core operating voltages of 2.2 VDC, 2.8 VDC and 3.5 VDC are required. Therefore, the fourth possible combination of transistor 222 turned on and transistor 220 turned off is not needed. The use of two transistors can be expanded to handle $2^2$ or four possible voltages. It should be understood from those skilled in the art, that the variable resistive networks can easily expanded to accommodate other core operating voltage requirements by adding additional transistors as required.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for selecting an operating voltage for a device, the method comprising the steps of:

varying the current through a resistor, the resistor having a first side connected in series with a variable resistive network;

charging an inductor with a modulate pulse train, the inductor being connected to the second side of the resistor outputting a voltage equal to the voltage across the resistor and to a fixed reference voltage located at the first side of the resistor;

determining if at least one designated device pin is connected to ground; and varying the resistance of the resistive network if at least one pin of the device is connected to ground so as to change the current flowing through the resistor, thereby changing the voltage across it.

2. The method of claim 1 wherein the step of outputting includes the sub step of:

connecting the fixed reference voltage to the feedback circuit of the power supply providing the modulated pulse train.

3. The method of claim 1 wherein the step of outputting a voltage further includes outputting a voltage compatible with the core voltage for an Intel Pentium compatible processor.

4. The method of claim 1 wherein the step of outputting a voltage further includes outputting a voltage compatible with the core voltage for an Intel Pentium or compatible processor with MMX technology.

5. The method of claim 1 wherein the step of outputting a voltage further includes outputting a voltage compatible with the core voltage for an AMD K6 or compatible processor.

6. The method of claim 1 wherein the step of charging an inductor includes charging an inductor with modulated pulse train with voltage potential that is at least equal to the operating voltage selected for a device.

7. An apparatus for selecting an operating voltage for a device, the apparatus comprising:

a resistor with a first and second end;

a variable resistive network connected in series to the first end of the resistor for varying the current through the resistor;

an inductor connected to the second end of the resistor;

a charging means for charging the inductor with a modulate pulse train;

a voltage equal to the voltage across the resistor and a fixed reference voltage located at the first side of the resistor;

determining means for determining if at least one designated device pin is connected to ground; and varying means for varying the resistance of the resistive network if at least one pin of the device is connected to ground potential so as to change the current flowing through the resistor, thereby changing the voltage across it.

8. The apparatus of claim 7 further comprising:

a power supply connected to inductor; and a feedback circuit for the power supply connected to the fixed reference voltage.

9. The apparatus of claim 7 further comprising an electronic device compatible with an Intel Pentium or compatible processor.

10. The apparatus of claim 7 further comprising a device compatible with an Intel Pentium or compatible processor with MMX technology.

11. The apparatus of claim 7 further comprising a device compatible with an AMD K6 or compatible processor.

12. The apparatus of claim 8 wherein the power supply is for producing a voltage potential that is at least equal to the operating voltage selected for a device.

* * * * *